(12) United States Patent
Campbell et al.

(10) Patent No.: US 11,785,031 B2
(45) Date of Patent: Oct. 10, 2023

(54) AUTOMATED AND SCALABLE WORKER ORCHESTRATION FOR CLOUD-BASED COMPUTER FORENSIC ANALYSIS

(71) Applicant: Cado Security Ltd, London (GB)

(72) Inventors: James Campbell, London (GB); Christopher Doman, London (GB)

(73) Assignee: Cado Security Ltd, London (GB)

( * ) Notice: Subject to any disclaimer, the term of this patent is extended or adjusted under 35 U.S.C. 154(b) by 260 days.

(21) Appl. No.: 17/172,788

(22) Filed: Feb. 10, 2021

(65) Prior Publication Data

US 2022/0255957 A1 Aug. 11, 2022

(51) Int. Cl.
*H04L 29/06* (2006.01)
*G06F 9/48* (2006.01)
*H04L 9/40* (2022.01)

(52) U.S. Cl.
CPC ........ *H04L 63/1425* (2013.01); *G06F 9/4881* (2013.01); *H04L 63/1416* (2013.01)

(58) Field of Classification Search
CPC ............. H04L 63/1425; H04L 63/1416; G06F 9/4881
See application file for complete search history.

(56) References Cited

U.S. PATENT DOCUMENTS

| | | | | |
|---|---|---|---|---|
| 10,310,896 B1* | 6/2019 | Kichak | ................. | G06F 9/4843 |
| 11,113,388 B2* | 9/2021 | Urias | .................. | G06F 9/45558 |
| 2012/0110433 A1* | 5/2012 | Pan | ....................... | G06F 40/103 |
| | | | | 715/234 |
| 2015/0082442 A1* | 3/2015 | Chauhan | ............. | H04L 63/1433 |
| | | | | 726/25 |
| 2018/0081728 A1* | 3/2018 | Choi | ...................... | G06F 9/5083 |
| 2019/0129747 A1* | 5/2019 | Kim | ...................... | G06F 9/5038 |
| 2019/0384632 A1* | 12/2019 | Parikh | .................. | G06F 21/552 |
| 2020/0396230 A1* | 12/2020 | Liu | ..................... | H04L 63/1441 |

FOREIGN PATENT DOCUMENTS

WO 2016138067 A1 9/2016

OTHER PUBLICATIONS

Baptista, A. et al., "Briareos—A Modular Framework for Elastic Intrusion Detection and Prevention", https://repositorio-aberto.up.pt/bitsream/1021/111469/2/260404.pdf; Feb. 15, 2018.
Heorhiadi, V. et al., "New opportunities for load balancing in network-wide intrusion detection systems", Emerging Network Experiments and Technologies, ACM, New York, NY, USA, pp. 361-372, Dec. 10, 2012.
Zarrabi, A. et al., "Internet Intrusion Detection System Service in a Cloud", IJCSI International Journal of Computer Science issues, vol. 9, No. 5, pp. 308-315, Sep. 1, 2012.

* cited by examiner

*Primary Examiner* — Kambiz Zand
*Assistant Examiner* — Afaq Ali
(74) *Attorney, Agent, or Firm* — Mughal Gaudry & Franklin PC

(57) ABSTRACT

Disclosed are techniques for performing forensic analysis of computer systems in a cloud network. The techniques can include using a scalable, cloud-based, specialized computer architecture for performing the forensic analysis of computer systems.

20 Claims, 10 Drawing Sheets

Project Processing

Waiting Tasks

| Task | Evidence | Project | MetaData | Run Local |
|------|----------|---------|----------|-----------|
| intel | 1 | 17 | | False |

Currently Processing

| Task | Evidence |
|------|----------|
| extract | xp_ddungan.001 |
| sha256_evidence | nfury.001 |
| t_filtered | nfury.001 |
| extract | 2008r2.001 |

Processed Tasks

- View Details  nfury.001 - timeline_files - 159 seconds
- View Details  nfury.001 - diskInfo - 0 seconds
- View Details  win7z32_nromanoff.001 - extract - 12 seconds

FIG. 9

AUTOMATED AND SCALABLE WORKER ORCHESTRATION FOR CLOUD-BASED COMPUTER FORENSIC ANALYSIS

TECHNICAL FIELD

The present disclosure relates generally to forensic analysis of computer systems and, more particularly (although not necessarily exclusively), to using a scalable, cloud-based, computer architecture for performing forensic analyses of computer systems.

BACKGROUND

The size and complexity of computer networks are increasing at a rapid pace. With increased size and complexity, however, networks can also become more vulnerable to security incidents, such as network attacks by adversaries. Computer forensic analyses can be performed in response to a security incident detected in a network. For example, computer forensic analyses can include collecting and preserving forensic artifacts (e.g., objects that have forensic value) within a network that was subject to a security incident, and investigating or reconstructing events within the network to determine how a security vulnerability was exploited. With computer networks becoming more complex, however, the task of collecting and preserving forensic artifacts within networks has become a burdensome process with many steps. Additionally, investigating the forensic artifacts can be very time consuming and computationally intensive; especially for security incidents that involve large amounts of computing devices.

SUMMARY

Certain aspects and features of the present disclosure relate to a computer-implemented method. The computer-implemented method can include collecting a plurality of items of forensic evidence from an attacked network. For example, the attacked network can be a network that was previously subject to a security incident. The computer-implemented method can include generating a set of tasks based on the plurality of items of forensic evidence collected from the attacked network and determining a number of workers to generate based on the set of tasks stored in the task queue. Each task of the set of tasks can be associated with one or more items of forensic evidence of the plurality of items of forensic evidence. Further, the set of tasks can be stored in a task queue. Each worker of the determined number of workers can be configured to process one or more tasks of the set of tasks. The computer-implemented method can also include generating the determined number of workers in a cloud network and executing the determined number of workers in parallel to process the set of tasks stored in the task queue. Other embodiments of this aspect include corresponding computer systems, apparatus, and computer programs recorded on one or more non-transitory computer storage devices, each configured to perform the actions of the methods described herein.

Implementations may include one or more of the following features. The computer-implemented method can further include detecting a particular task from amongst the set of tasks stored in the task queue, determining that the particular task includes acquiring the one or more items of forensic evidence from the attacked network, and generating a new worker to process the particular task. Determining the number of workers to generate can further include detecting a particular task from amongst the set of tasks stored in the task queue. The particular task can be associated with a particular item of forensic evidence of the plurality of items of forensic evidence. Further, determining the number of workers to generate can include determining that the particular task does not include acquiring the one or more items of forensic evidence from the attacked network, identifying a previously-generated worker associated with the particular item of forensic evidence, and processing the particular task using the previously-generated worker and the particular item of forensic evidence.

Executing the determined number of workers in parallel can include detecting a particular task from the set of tasks stored in the task queue, retrieving a particular item of forensic evidence associated with the particular task, and performing the particular task using the particular item of forensic evidence associated with the particular task. Executing the determined number of workers in parallel can further include assigning a particular item of forensic evidence of the plurality of items of forensic evidence to a particular worker, determining that a particular task corresponds to the particular item of forensic evidence, determining that a particular worker or a main server can be configured to process the particular task using the particular item of forensic evidence, and processing the particular task using the particular worker or the main server, depending on whether the particular task was processed by the particular worker or the main server. Each dependent task of the one or more dependent tasks can be processed in association with the particular task. The computer-implemented method can include processing the particular task and the one or more dependent tasks, detecting malicious activity within the attacked network, and in response to detecting the malicious activity, adding one or more additional tasks to the set of tasks included in the task queue. The computer-implemented method can also include terminating each worker of the determined number of workers to reduce a processing burden imposed on cloud compute resources. Implementations of the described techniques may include hardware, a method or process, or computer software on a computer-accessible medium.

Embodiments of the present disclosure include a system. The system may comprise: one or more data processors; and a non-transitory computer-readable storage medium containing instructions which, when executed on the one or more data processors, cause the one or more data processors to perform operations including the methods described above and herein.

Embodiments of the present disclosure include a computer-program product tangibly embodied in a non-transitory machine-readable storage medium, including instructions configured to cause a data processing apparatus to perform operations including the methods described above and herein.

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

FIG. 9 is an example of a user interface generated by a specialized computer architecture, according to some aspects of the present disclosure.

Figure 1:
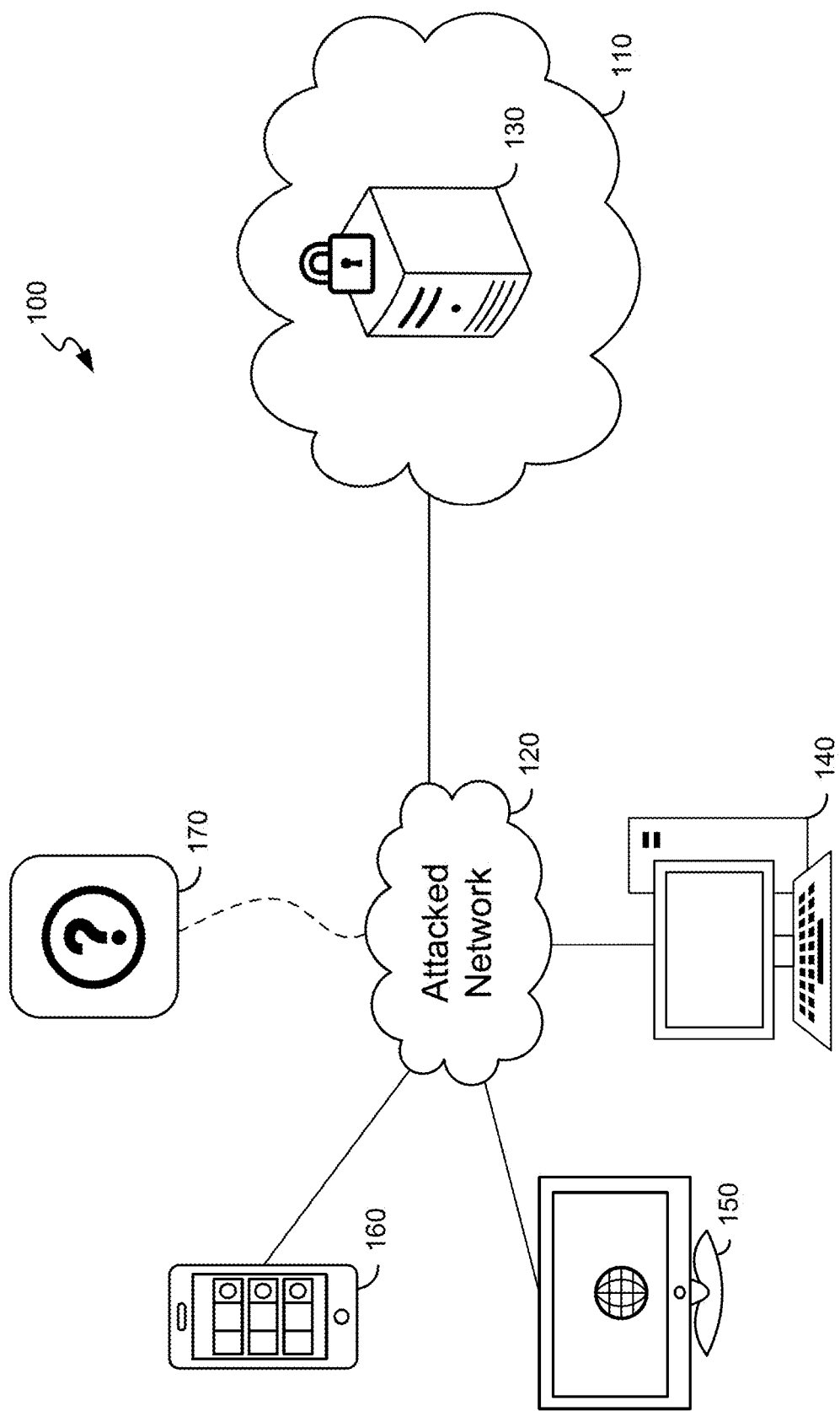
FIG. 1 is a block diagram of an example of a specialized computer architecture configured to perform forensic analysis of computing systems, according to some aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and examples of the present disclosure relate to a specialized computer architecture configured to perform computer forensic techniques on a network in a scalable and computationally efficient manner. For example, a network can include one or more on-premises networks, cloud networks, or containerized systems that have been the subject of a security incident. A security incident can occur when an adversary (e.g., human or automated) exploits a security vulnerability of the network. Forensic data can be any information relating to how the security incident was carried out (e.g., the attack method, a trajectory of an adversary, and so on). The specialized computer architecture can be configured to acquire forensic data from the network, process the forensic data using an automated and scalable processing technique to detect malicious activity, and provide a contextual user-assisted workflow for guiding a user through the processing of the forensic data.

The specialized computer architecture can acquire forensic data by collecting a copy of each computer, server, host, or other system that accessed the network. The specialized computer architecture can acquire the forensic data from disparate networks (e.g., cloud networks and local on-premises networks), while maintaining a full chain of custody. For example, the forensic data can include a log capturing the identity of hosts that accessed a server and a time stamp associated with each instance that a host accessed the server. The specialized computer architecture can also generate a hash of the forensic data.

The specialized computer architecture can process the forensic data using scalable processing techniques. Processing the forensic data can include storing the logs of the forensic data in a cloud network, parsing the logs, and searching through the logs for security vulnerabilities. For example, processing the forensic data can include searching for malware by evaluating every string in every file included in the forensic data. The specialized computer architecture can be configured to execute scalable processing techniques to improve the speed and computational efficiency of processing the forensic data. The scalable processing techniques can include splitting the processing of the acquired forensic data into a number of discrete tasks and processing those tasks in parallel using a set of workers. A worker can be a single computer instance running in a cloud environment. The size of a worker can be determined based on a size of the forensic data the worker is assigned to process. As an illustrative example, for an 8 Gigabyte (GB) disk image, the specialized computer architecture can generate one or more workers, each with 8 processors and 32 GB Random Access Memory (RAM). For a larger 15 Terabyte (TB) disk, the specialized computer architecture can generate one or more workers with a size of 96 processors and 768 GB RAM. Additionally, the worker can be configured to retrieve a task (e.g., from a queue storing the various tasks) and process the task, retrieve another task, process that task, and so on. The specialized computer architecture can evaluate the queue of tasks to determine how many new workers to generate to process the tasks. For example, the number of new workers generated can depend on the number of tasks stored in the queue. The specialized computer architecture can automatically generate new workers in the cloud network to process these tasks. Any number of workers can be generated to process these tasks. Each worker can process a task retrieved from the queue in parallel with other workers of the set of workers. After the tasks are processed, the workers can be terminated, thereby reducing the processing burdens of the workers on the cloud compute resources of the specialized computer architecture.

The specialized computer architecture can be configured to generate a contextual user-assisted workflow that guides a user through the processing of the forensic data. For example, the specialized computer architecture can automatically identify attributes of the security incident that impacted the network, and then generate a user-assisted workflow that provides a user with suggestions of operations that are contextual to the security incident. In some implementations, the user-assisted workflow can enable the user to browse through the file system associated with the impacted network. In some implementations, the specialized computer architecture can be configured to automatically suggest investigative and remediation actions for the user (e.g., a non-expert or an investigator) to perform. As an illustrative example, if the specialized computer architecture detected a malicious domain name, the contextual user-assisted workflow can include a recommendation of an action to block this domain name. The user can then select the recommended action, which can cause the specialized computer architecture to perform or facilitate performance of the recommended action. As another illustrative example, if the specialized computer architecture detected credit card information on a system with malware, the contextual user-assisted workflow can include a series of remediation and investigative actions, including generating a prompt that asks users specific questions about their environment (e.g., "Is this system known to have been compromised?") to further customize the recommended analysis.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a scalable cloud-computing system architecture configured to perform forensic analysis of computing systems, according to some aspects of the present disclosure. Network environment 100 can include cloud network 110 and attacked network 120. Cloud network 110 can be any set of servers and databases associated with a cloud network. Further, cloud network 110 can include cloud-based response system 130, which may be the specialized computer architecture (described above) configured to perform forensic functionality, such as acquiring forensic evidence from attacked network 120, processing the forensic evidence using automated and scalable techniques, and providing a user-assisted workflow that can guide a user through the processing of the forensic evidence. Further, cloud-based response system 130 can include one or more networks (e.g., public network or private network) that include one or more servers and one or more databases. The one or more servers can be configured to execute source code that, when executed, performs the forensic functionality, as described in various implementations herein.

Attacked network 120 can be any one or more on-premises networks, cloud networks, or containerized systems (or any combination thereof). Further, attacked network 120 may include at least one computing device that was the subject of a security incident. A security incident can occur when an adversary (e.g., human or automated) exploits a security vulnerability of the network. As an illustrative example, a security incident may be a computing device that makes unauthorized changes to one or more files stored in a database.

Each of cloud-based response system 130 and attacked network 120 can include any open network, such as the Internet, personal area network, local area network (LAN), campus area network (CAN), metropolitan area network (MAN), wide area network (WAN), wireless local area network (WLAN); and/or a private network, such as an intranet, extranet, or other backbone. In some implementations, attacked network 120 and cloud-based response system 130 can digitally communicate with each other using any digital link (e.g., wired or wireless, such as a Bluetooth or Bluetooth Low Energy channel).

In some implementations, communications between two or more systems and/or devices included in network environment 100 can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

As illustrated in the example of FIG. 1, the attacked network 120 can be connected to computer 140, Smart TV 150, and mobile device 160. The attacked network 120 can be any on-premises, cloud, or containerized system, for example, one that is operated by or for an enterprise. The network host 170 can be any network entity, such as a user, a device, a component of a device, or any other suitable computing device connected to a computer network, such as the attacked network 120. The network host 170 can execute a network attack on the attacked network 120 as an unauthorized network host, such as a human or automated hacker, a computer virus, or other malicious code. The network host 170 can access secured servers or databases included within the attacked network 120 to collect, delete, or modify data (e.g., secured files) in an unauthorized manner. The network host 170 can access the secured servers or databases in an unauthorized manner due to a security vulnerability in the attacked network 120, such as a weak password required to access the attacked network 120. Either substantially in real-time or non-real-time, the network host 170 can access certain data stored within the attacked network 120 in an authorized manner (e.g., a website that allowed access after a cookie has been installed in a browser) or an unauthorized manner (e.g., attacked network 120 may be hacked by network host 170). Either way, the network host 170 can evaluate the collected data or can modify existing data stored in the attacked network 120. According to certain implementations described herein, the cloud-based response system 130 can be used to acquire forensic evidence that may provide details on network host 170 and the attacked network 120, process the forensic evidence in a scalable and computationally efficient manner, and/or provide a user-assisted workflow for guiding a user (e.g., a non-expert) through the forensic analysis process.

Figure 2:
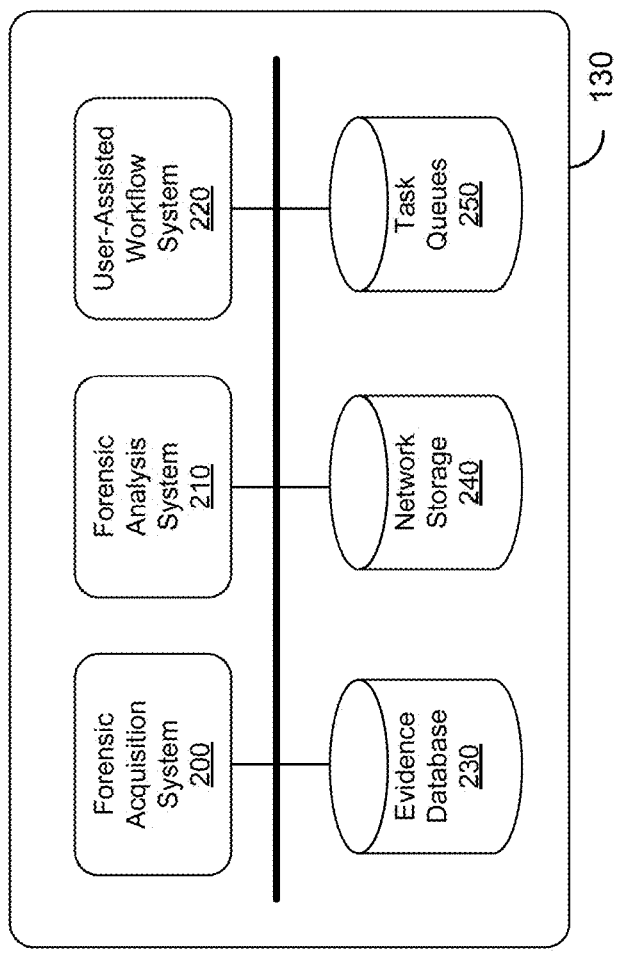
FIG. 2 is a block diagram of another example of a specialized computer architecture configured to perform forensic analysis of computing systems, according to some aspects of the present disclosure.

FIG. 2 is a block diagram of another example of a specialized computer architecture configured to perform scalable forensic analysis of computing systems, according to some aspects of the present disclosure. The cloud-based response system 130 can be a cloud-computing network that includes a forensic acquisition system 200, a forensic analysis system 210, and a user-assisted workflow system 220. Each of the forensic acquisition system 200, the forensic analysis system 210, and the user-assisted workflow system 220 can include one or more processors and memory storing executable code that, when executed by the one or more processors, performs functionality described herein.

The forensic acquisition system 200 can be configured to perform a forensic acquisition of forensic data from the attacked network 120. For example, the forensic acquisition system 200 can collect a copy of each computer, server, host, or other system that accessed the attacked network 120. Further, the forensic acquisition system 200 can perform the forensic acquisition regardless of whether the attacked network 120 is a cloud network (e.g., Amazon Web Services (AWS) Elastic Compute Cloud (EC2)™, Azure™), local on-premises network, or containerized system (e.g., Docker™, Kubernetes™, OpenShift™, AWS Fargate™), or any combination thereof. The forensic acquisition system 200 can acquire the forensic data from the attacked network 120 in a manner that maintains a full chain of custody. For example, the forensic data can include a log capturing which hosts accessed a server and a time stamp associated with each instance that a host accessed a server. The forensic acquisition system 200 can also generate a hash of the acquired forensic data and store that hash. The forensic data acquired by the forensic acquisition system 200 can be stored in the evidence database 230.

In some implementations, the forensic acquisition system 200 can acquire forensic data from the attacked network 120 using Application Programming Interfaces (APIs) of a cloud provider to copy disks attached to a target system or network. The forensic acquisition system 200 can then create a new machine configured to attach the disks of the target system or network to the new machine. The forensic acquisition system 200 can configure the new machine to match the size of the target system or network in terms of the same number of CPUs, RAM, and so on. The forensic acquisition system 200 can turn the new machine off as the disks of the target system or network are attached to avoid potential errors. The forensic acquisition system 200 can also be configured to directly copy the target disks to cloud storage. The forensic acquisition system 200 can compress the forensic data collected from the attacked network 120 as the forensic data is uploaded to the cloud storage, and perform a cryptographic hash of the copied disk to create a Chain of Custody that ensures the disk image is a true copy of the original disk.

The forensic analysis system 210 can be configured to process the forensic data to detect malicious activity that caused the security incident in the attacked network 120. In some implementations, processing the forensic data can include parsing logs and file content included in the forensic data to detect the malicious activity. Processing the forensic data can also include unifying and matching different data sources. A network storage 240 can store, for example, the source code and evidence files accessed by the workers or the cloud-based response system 130. As an illustrative example, the network host 170 accessed an on-premises network in an unauthorized manner (e.g., through a security vulnerability, such as an unrestricted ability to uploaded files, which may contain malware). While the unauthorized network host 170 was connected to the on-premises network, the network host 170 accessed ten different machines within the network. Each of the ten machines captured a log of any communications with the network host 170. The forensic analysis system 210 can automatically match the logs across the ten different machines to identify a sequence of events performed by the unauthorized network host 170. The forensic analysis system 210 can match logs based on any attribute within the logs, such as user name or IP address. Additionally, even if one or more of the logs had a different structure (e.g., different order of data fields), or even if one or more logs used a different naming protocol to uniquely identify a communication with the unauthorized network host 170, the forensic analysis system 210 can perform fuzzy matching techniques to match the logs together to determine the sequence of events performed by the unauthorized network host 170. As an illustrative example, the forensic analysis system 210 can detect and extract the name of network hosts from logs, regardless of the exact structure of the log format. The forensic analysis system 210 can execute logic to fuzzy match the extracted names of network hosts, for example, by removing the network domain from systems. If, for example, the forensic analysis system 210 detects a connection from PC-XYZ in one log, and a connection from PC-XYZ.example.com in another log, the forensic analysis system 210 can still identify these two logs as connections from the same system using the fuzzy matching techniques.

In some implementations, the forensic analysis system 210 can process the forensic data using a scalable processing technique. The forensic analysis system 210 can evaluate the forensic data to generate a set of tasks that need to be performed as part of processing the forensic data. The forensic analysis system 210 can be configured to execute logic that selects a subset of tasks from a set of available tasks to process the forensic data. The subset of tasks can be selected based on the forensic data acquired from the attacked network 120. Non-limiting and non-exhaustive examples of tasks are shown in Table 1 below.

TABLE 1

| Task Identifier | Task Explanation |
| --- | --- |
| Cloud_Acquire | Copy a system to a storage service (e.g., Amazon S3 ™) |
| Cloud_Downloader | Download a system from a storage service |
| Decompress_And_Mount | Decompress (e.g., .GZ) and mount file systems (e.g., XFS) |
| Timeline_Files | Build a timeline of file creation events before or after the security incident was detected |
| Extract_Files | Extract files from a file system for later processing |
| Parse_Custom_Timelines | Parse custom types of events |
| Disk_Info | Record disk size |
| Hash | Hash all files on disk |
| Malware_Scans | Run scans using a library (e.g., Yara) |
| Timeline_Files | Parse logs and system data using a timeline library |
| Strings | Extract and index strings from all files |
| Detect_PII | Detect personally-identifiable information using machine-learning models, such as a Bayes model |
| Hash_Disk | Hash the disk image |
| Create_Alerts | Run detection rules that match on parsed logs and text |
| Intel | Run intelligence service lookups against detected files |
| IOC_Extract | Match malicious domains etc. based on the contents of files |
| Detach | Unmount any disk images still mounted |

The forensic analysis system 210 can determine a number of workers to generate to process the tasks, and then execute each worker in parallel to process the tasks. When a worker completes a task, then the worker can access the queue of tasks, retrieve the next task in the queue, and then process the retrieved task. For example, the tasks can be stored in task queues 250. Workers retrieve and process tasks in parallel until all of the tasks in the queue have been processed and completed. When all of the tasks have been processed, the workers automatically terminate, thereby making available the processing resources (e.g., vCPU and memory) for other purposes, such as for processing the forensic data associated with a different security incident. The forensic analysis system 210 improves the functioning of servers in a cloud network because fewer computing resources are used for processing the tasks (e.g., due to the workers automatically terminating after the tasks are all processed) and the tasks are processed faster (e.g., due to the tasks being processed by workers in parallel and scaled to match the processing load associated with the set of tasks). In some implementations, the forensic analysis system 210 can evaluate each task to determine the number of workers to generate. For example, a given task may need to be processed by two workers, whereas, a different task may only need to be processed by one worker. The number of workers to process per task can be determined or configured automatically (e.g., using a trained machine-learning model) or by a client (e.g., an entity associated with an investigator operating the cloud-based response system 130 to analyze a security incident). As an illustrative example, the forensic analysis system 210 can evaluate the forensic data and, in response to the evaluation, generate 300 tasks. The 300 tasks can be stored in a queue. The forensic analysis system 210 can evaluate the 300 tasks and, in response to the evaluation, generate 100 workers. Each worker can retrieve a task from the queue and process the task against the data available to the worker. Further, the 100 workers process the 300 tasks from the queue in parallel. When a worker completes one task, that workers evaluates the queue to determine whether another task is available to process. After the 300 tasks have been processed, the 100 workers are automatically terminated, thus freeing up compute resources.

The user-assisted workflow system 220 can be configured to generate a workflow of suggested tasks to guide a user through the security incident response under investigation. The user-assisted workflow system 220 can select operations (for the workflow) that are contextual to the attributes of the security incident under investigation. As an illustrative example, the user-assisted workflow system 220 can evaluate the forensic evidence to identify that the network was attacked via a phishing email used to gain access to the network. In response, the user-assisted workflow system 220 can generate a workflow of suggested actions or tasks for the user to initiate as part of processing the forensic data to identify malicious activity that occurred after the breach of the network. For example, a suggested task can be to run a particular scan of the forensic data to identify malicious data within the network.

In some implementations, the user-assisted workflow system 220 can be configured to automatically recommend actions (e.g., investigative and remediation actions) for the user to perform (e.g., based on predefined rules). As an illustrative example, if the user-assisted workflow system 220 detected a malicious domain name, then the user-assisted workflow system 220 can generate a contextual user-assisted workflow that includes a recommendation of an action to block this domain name from accessing the attacked network. The user can then select the recommended action, which can cause the user-assisted workflow system 220 to perform or facilitate performance of the recommended action. As another illustrative example, if the user-assisted workflow system 220 detected credit card information on a system with malware, then the user-assisted workflow system 220 can generate a contextual user-assisted workflow that includes a series of remediation and investigative actions, including generating a prompt that asks users specific questions about their environment (e.g., "Is this system known to have been compromised?") to further customize the recommended analysis.

Figure 3:
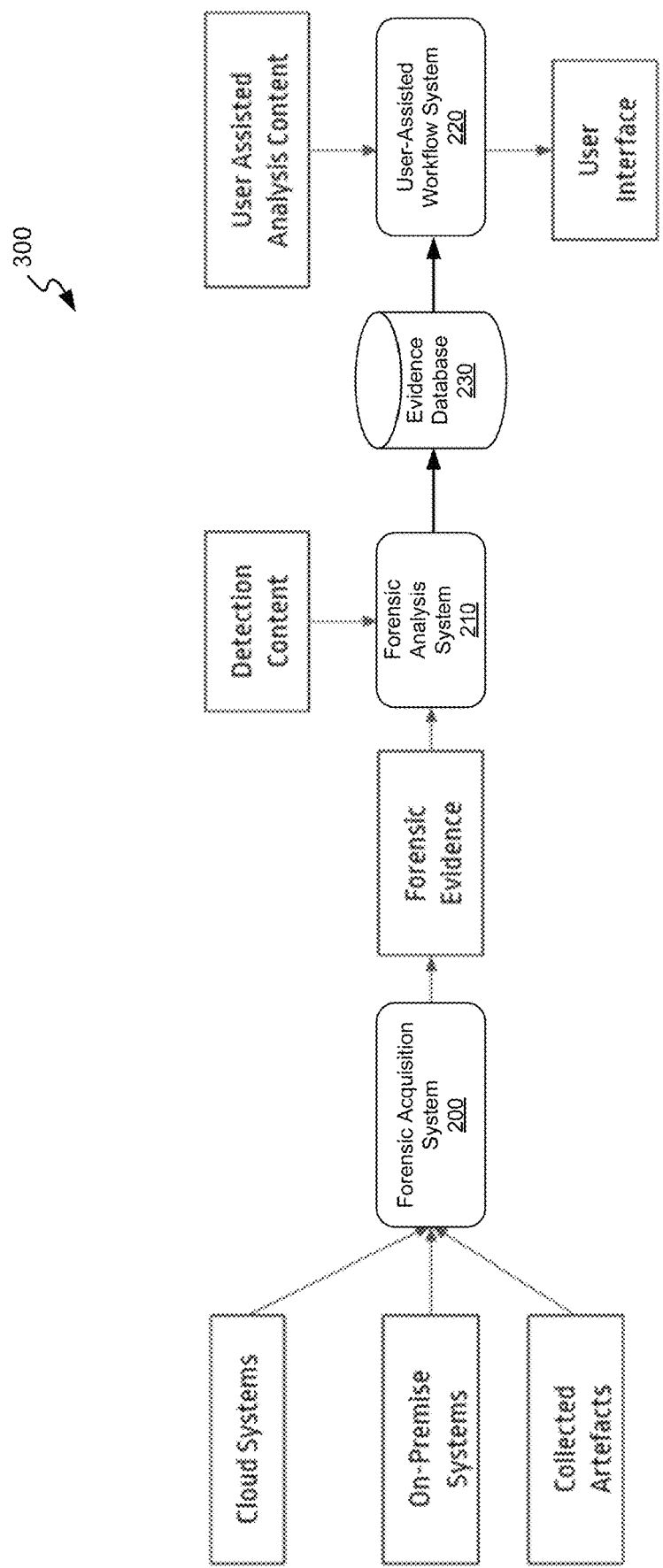
FIG. 3 is a block diagram illustrating an example of a work flow that uses a specialized computer architecture to perform forensic analysis of computing systems, according to some aspects of the present disclosure.

FIG. 3 is a flow chart illustrating an example of a workflow 300 for the specialized computer architecture configured to perform forensic analysis of computing systems, according to some aspects of the present disclosure. The forensic acquisition system 200 can acquire forensic data (referred to interchangeably herein as forensic evidence) from any type of network, such as a cloud system, on-premises systems, containerized systems, and/or other collected forensic artifacts. The forensic evidence can be the output of the forensic acquisition system 200. For example, the forensic evidence can be a hash of a set of logs acquired by the forensic acquisition system 200. The forensic acquisition system 200 can acquire the forensic evidence with a full chain of custody. For a given item of forensic evidence, such as a file, the chain of custody represents a chronological documentation of interactions with the file. For example, the chain of custody can document the attributes of each user or network host that accessed the file, the date and time the file was accessed, any transfers of the file, and the purpose of the transfer.

The forensic analysis system 210 can analyze the forensic evidence to detect malicious data stored in the attacked network 120. The forensic analysis system 210 can evaluate the forensic evidence to generate a set of tasks to process. Processing the tasks can be performed to detect malicious events (e.g., unauthorized access to servers) or malicious data (e.g., malware stored within the network). The forensic analysis system 210 can process the set of tasks using a scalable processing technique. For example, the forensic analysis system 210 can evaluate each task in the set of tasks to determine a number of workers needed to process the task. Then, after evaluating the set of tasks, the forensic analysis system 210 can determine how many workers are needed to process the entire set of tasks. The forensic analysis system 210 can then execute each worker of the determined number of workers in parallel. Executing each worker in parallel is described in greater detail with respect to FIG. 7. The detection content, which is also inputted into the forensic analysis system 210, can include any information that facilitates the detection of malicious activity (e.g., logs or file content). The output of the forensic analysis system 210 can be stored in the evidence database 230. The output of the analysis system 210 can include a result of processing the set of tasks. For example, the output can include a sequence of events that an unauthorized user (e.g., network host 170) performed after a breach of the network occurred.

Figure 10:
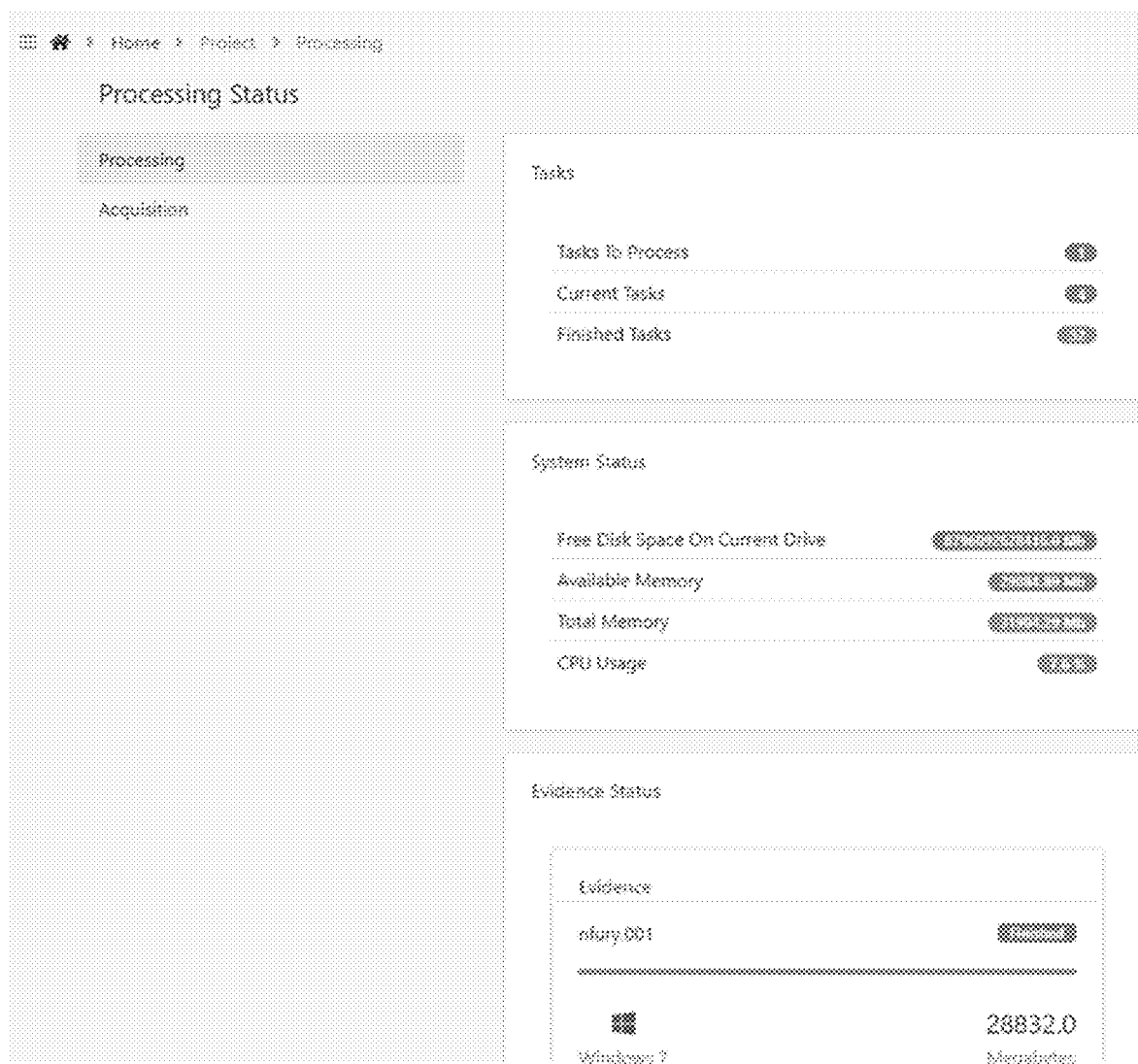
FIG. 10 is another example of a user interface generated by a specialized computer architecture, according to some aspects of the present disclosure.

In some implementations, the user-assisted workflow system 220 can be provided in the workflow 300. The user-assisted workflow system 220 can be configured to generate an interface that presents aspects (e.g., stages) of the processing of the forensic evidence. As an illustrative example, the user-assisted workflow system 220 can generate and present interface 900 illustrated in FIG. 9 or interface 1000 illustrated in FIG. 10. Interface 900 can present the tasks and a progress or status of each task in a viewable manner. Interface 900 can present the tasks that are waiting to be processed by a worker, the tasks that are currently being processed by a worker, and the tasks that have been processed by a worker. Interface 1000 can present the status of the task processing, and additionally, can present aspects of the network being investigated, such as available memory, the status of acquiring forensic evidence, and any other suitable aspects of the investigation into the one or more security incidents.

The user-assisted workflow system 220 can be configured to present adaptive instructions on an interface that guide a user (e.g., an investigator operating a user device to access the cloud-based response system 130 to investigate a specific security incident in a network) through the processing of the tasks. In some implementations, the adaptive instructions can include instructions that are contextual to the type of security breach detected in the network by the cloud-based response system 130. For example, if the detected security breach is a malware attack caused by a phishing email, then the user-assisted workflow system 220 can automatically adapt the instructions to be contextual to malware attacks, whereas, if the detected security breach is an exploit attack (e.g., an attack that exploits a vulnerability within the network), then the user-assisted workflow system 220 can automatically adapt the instructions be contextual to exploit attacks. In some implementations, the adaptive instructions can provide a description of the type of attack and other risks associated with the specific type of security breach that is associated with the investigation. In some implementations, the user-assisted workflow system 220 can identify which adaptive instructions to present to a user using one or more predefined rules.

Figure 4:
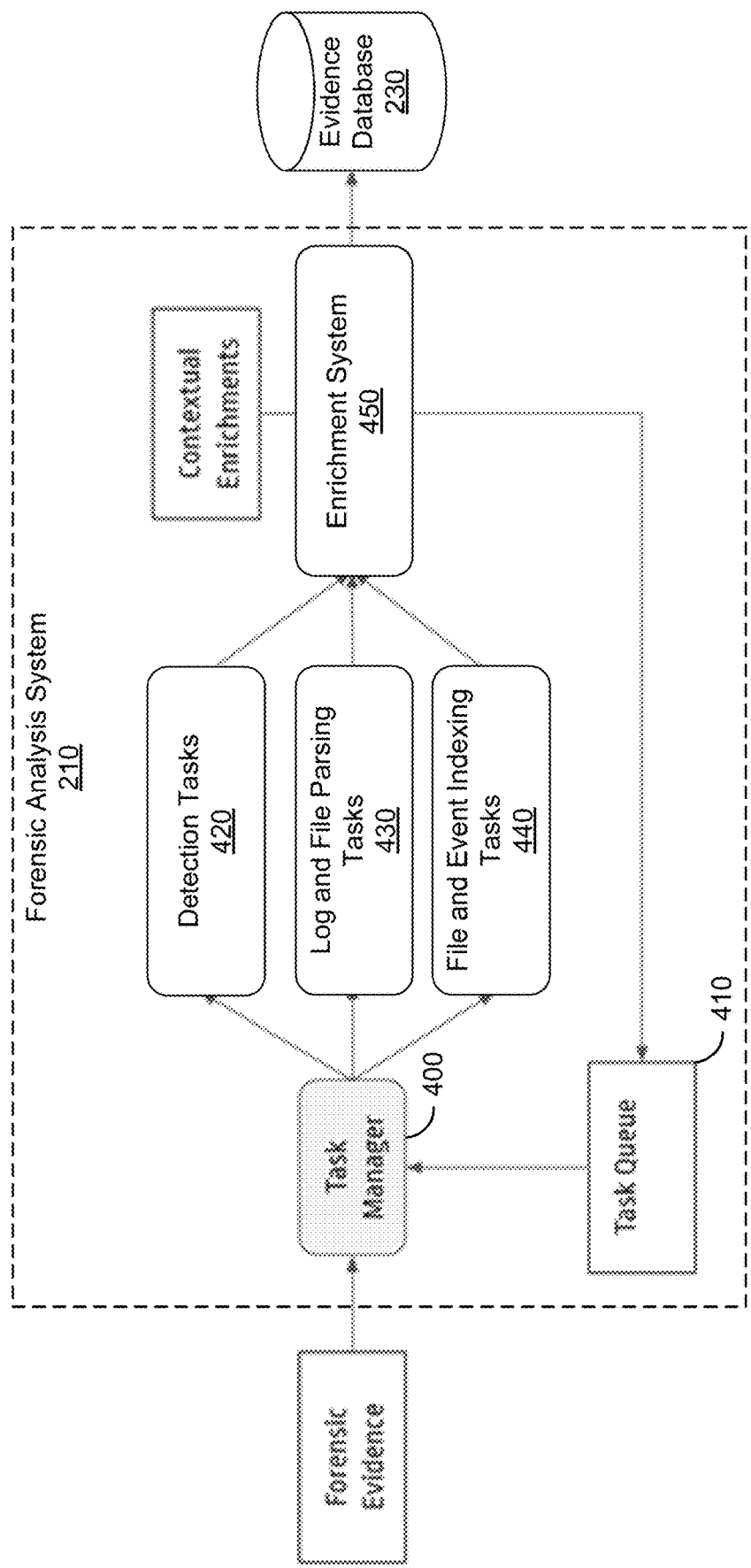
FIG. 4 is a block diagram illustrating another example of a work flow that uses the specialized computer architecture to perform forensic analysis of computing systems, according to some aspects of the present disclosure.

FIG. 4 is a block diagram illustrating another example of a work flow that uses the specialized computer architecture to perform forensic analysis of computing systems, according to some aspects of the present disclosure. In some implementations, the forensic analysis system 210 can include a task manager 400, a task queue 410, and an enrichment system 450. Each of the task manager 400, the task queue 410, and the enrichment system 450 can include one or more processors and memory storing executable code that, when executed by the one or more processors, performs functionality described herein.

The task manager 400 can be configured to evaluate the forensic data collected from the attacked network (e.g., attacked network 120) and, in response to the evaluation, to generate a set of tasks that, when executed, facilitate the detection of malicious data or malicious activity within the attacked network. For example, the task manager 400 can generate the set of tasks, including some or all of the tasks included in Table 1 above. Other tasks not included in Table 1 can be included in the set of tasks. In some implementations, the task manager 400 can execute logic that generates a set of tasks that is contextual to the security breach that is under investigation. Certain tasks from Table 1 may not be necessary for a given type of security breach, and thus, the task manager 400 can select a subset of tasks from Table 1, for example, based on one or more rules.

As an illustrative example, for a security breach associated with a malware attack, the task manager 400 can select one or more detection tasks 420, one or more log and file parsing tasks 430, and one or more file and event indexing tasks 440 to be stored in the task queue 410 for processing. The one or more log and file parsing tasks can include executing one or more parsers that search through strings of data in every file to detect malicious code (e.g., the one or more parsers can be executed using a timeline and log parsing library). The set of tasks generated or selected by the task manager 400 can be stored in a task queue 410. The task queue can store an identifier of each available task and/or other attributes or characteristics of the task (e.g., a pointer to forensic evidence that triggered the task manager 400 to generate or select the task for processing).

The enrichment system 450 can be configured to evaluate logged events included in the forensic evidence to match certain logged events based on one or more factors. For example, if a network host breached the network in an unauthorized manner and interacted with five different servers after the breach, then each server of those five servers would have captured the interaction in a log with various details associated with the interaction. The enrichment system 450 can extract certain details from the logged events and match certain logs to generate a sequence of interactions that occurred with the network host. Non-limiting examples of the various details that can be extracted from the logged events include username, computer name, event identifier, file name, host name, source and destination, event type or tags, and any other suitable details that can be captured in a log. The extracted details can be used to match logs together and/or to provide contextual information to a given event of log entry. The enrichment system 450 can execute fuzzy matching techniques that match details extracted from logs, even if those details do not match up exactly (e.g., user names being slightly different across logs, but representing the same user).

Figure 5:
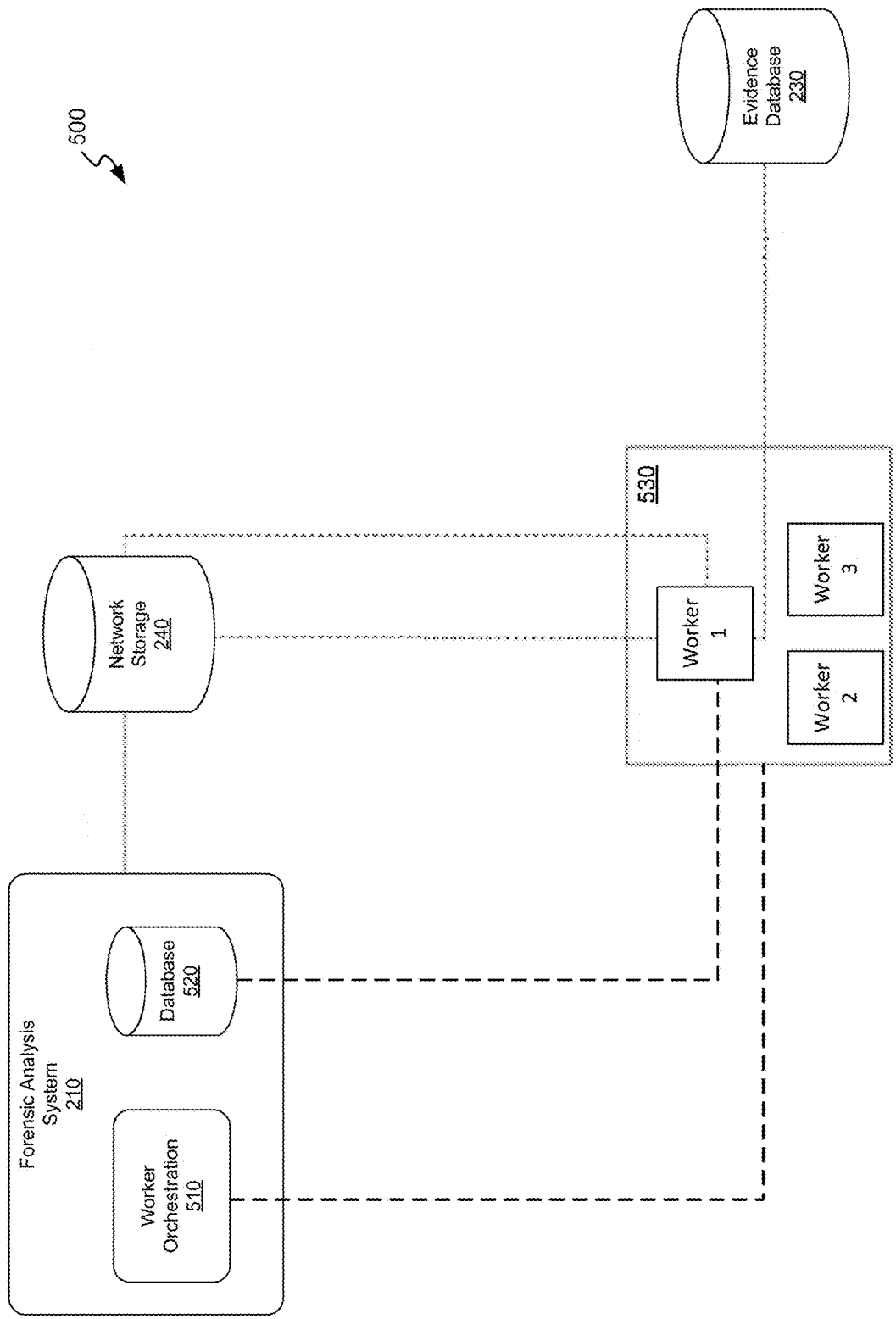
FIG. 5 is a block diagram of yet another example of a specialized computer architecture configured to perform forensic analysis of computing systems, according to some aspects of the present disclosure.

FIG. 5 is a block diagram of yet another example of the specialized computer architecture configured to perform forensic analysis of computing systems, according to some aspects of the present disclosure. A network environment 500 can include the forensic analysis system 210, the network storage 240, a worker system 530, and evidence database 230. The network environment 500 can be configured to evaluate a set of tasks (e.g., that are determined based on a result of the cloud-based response system 130 evaluating the forensic evidence stored in the evidence database 230), determine whether and how many workers to generate (e.g., spin up) to process the set of tasks, generate the determined number of workers, process the set of tasks using the determined number of workers in parallel, and then terminate the workers to make the compute resources used by the workers available for other purposes.

The forensic analysis system 210 can include a worker orchestration system 510 and a database 520. The worker orchestration system 510 can be configured to detect that a task is available to be performed by a worker. The task can be included in a set of tasks stored in a queue. The worker orchestration system 510 can then determine whether or not to generate a new worker to process the task. For example, the worker orchestration system 510 can perform operations, as described with respect to FIG. 7, to determine whether or not to generate a new worker to process the task. If the worker orchestration system 510 determines not to generate a new worker, then the worker orchestration system 510 can detect another task and render another determination regarding whether or not to generate a new worker. Alternatively, the worker orchestration system 510 can identify an existing worker that can process the task.

When the forensic analysis system 210 determines to generate a new worker, the forensic analysis system 210 can transmit a signal to the worker system 530. The signal can include instructions that, when received at the worker system 530, can cause the worker system 530 to generate a new worker from available compute resources (e.g., available vCPU and memory). For example, as illustrated in FIG. 5, the worker system 530 generated has three workers generated (e.g., worker 1, worker 2, and worker 3). While FIG. 5 illustrates that three workers have been generated, it will be appreciated that the worker system 530 can generate any number of workers (e.g., 10s, 100s, 1000s, and so on). Worker 1, for example, can be assigned to process the given task detected by the worker orchestration system 510. In response, worker 1 can access the evidence database 230 to retrieve forensic data associated with the given task from a specific storage location. Worker 1 can then process the task using the retrieved forensic data associated with the task. Processing the task can include worker 1 retrieving certain code (e.g., worker code) from the network storage 240. After worker 1 processes the task using the associated forensic data, worker 1 can output a result of the processing to the database 520 and to the network storage 240. Additionally, after worker 1 processes the task, worker 1 can then fetch another task from the available tasks of the set of tasks stored in the queue, and process that task. This process continues until all of the tasks stored in the queue are processed.

Advantageously, the worker system 530 can improve the functioning of servers of the cloud-based response system 130. For example, the worker system 530 improves the speed of processing a set of tasks because a scalable number of workers generated by the worker system 530 (e.g., workers 1, 2, and 3, as illustrated in FIG. 5) can process the corresponding or assigned tasks in parallel. Additionally, the worker system 530 improves the functioning of the servers of the cloud-based response system 130 by reducing the compute resources used during the processing of the tasks. When all of the tasks have been processed (e.g., there are no more available tasks in the queue available to process), then the worker system 530 can terminate (e.g., spin down) all of the workers (e.g., workers 1, 2, and 3, as illustrated in FIG. 5). Terminating the workers causes the compute resources that were allocated to the workers to be made available for other purposes. Accordingly, the processing burden that the workers impose on the compute resources of the cloud-based response system 130 is significantly reduced, thereby improving the overall functioning of the cloud-based response system 130.

Figure 6:
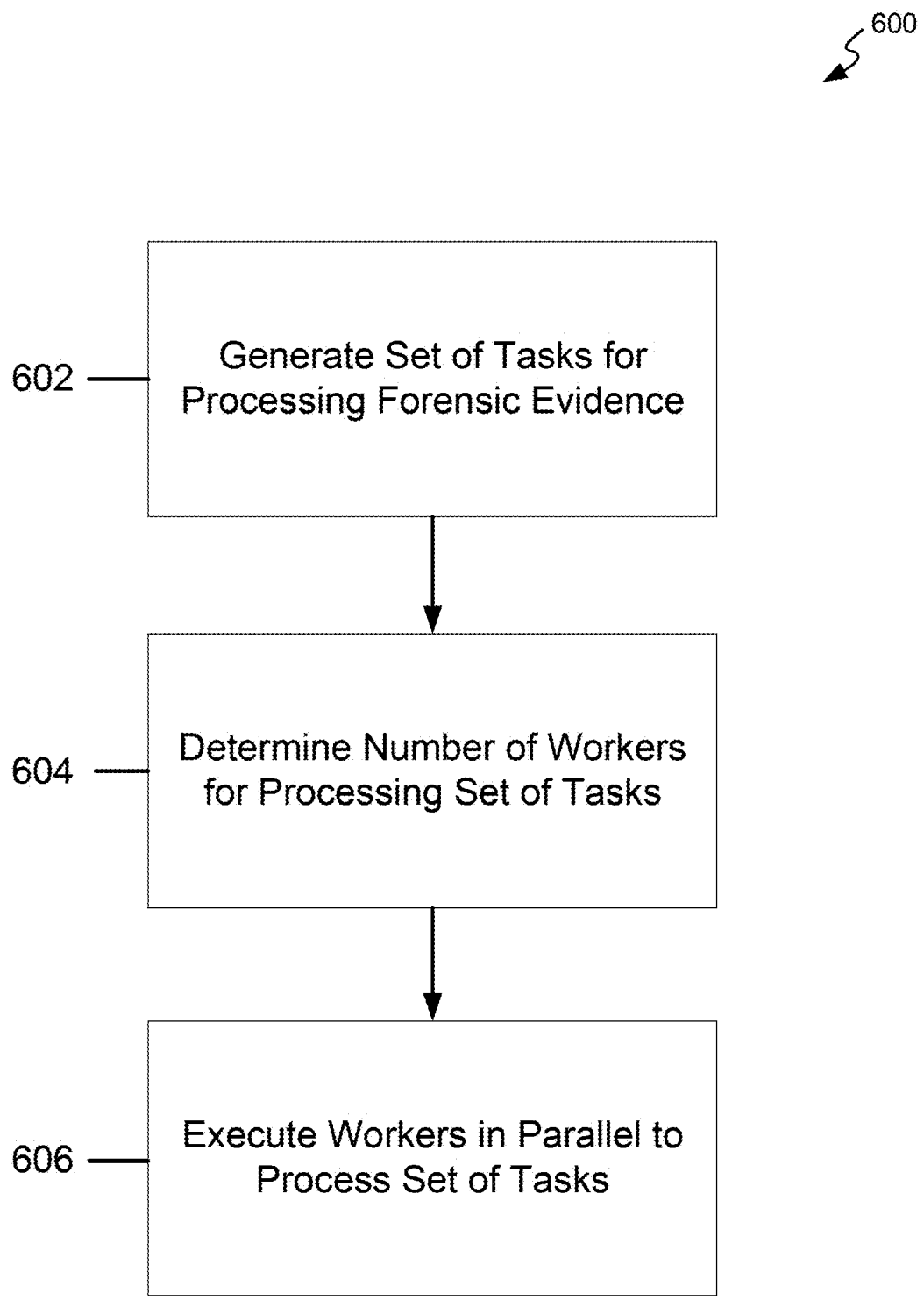
FIG. 6 is a flow chart illustrating an example of a process for performing forensic analysis of computing systems via cloud computing using a specialized computer architecture, according to some aspects of the present disclosure.

FIG. 6 is a flow chart illustrating an example of a process 600 for performing forensic analysis of computing systems via cloud computing using the specialized computer architecture, according to some aspects of the present disclosure. The process 600 can be performed at least in part by any component described with respect to FIGS. 1-5. For example, the process 600 can be performed by the forensic analysis system 210, illustrated in FIG. 2. Further, the process 600 can be performed to detect malicious data or malicious activity within a network (e.g., the attacked network 120, which experienced a security breach) using a scalable processing technique that improves the computational efficiency of computer forensic analysis or investigation.

Process 600 begins at block 602, where the forensic analysis system 210 of the cloud-based response system 130 can generate a set of tasks for processing forensic evidence. The forensic analysis system 210 can identify a type of security breach associated with a network attack, and identify a set of tasks that facilitate the detection of malicious activity within the network. The set of tasks can be identified based on the type of security breach under investigation. For example, the forensic analysis system 210 can generate the set of tasks included in Table 1 to detect malicious data or malicious activity that occurred within the network before or after the security breach was detected.

At block 604, the forensic analysis system 210 can determine a number of workers that need to be generated (e.g., spun up) using cloud compute resources to process the set of tasks generated at block 602. The process for determining the number of workers to generate is described below with respect to FIG. 7. Each worker can be allocated a portion of the cloud compute resources available to the cloud-based response system 130.

At block 606, the forensic analysis system 210 can execute the workers in parallel to process the set of tasks generated at block 602. The process for executing the tasks in parallel is described below with respect to FIG. 8. When each worker completes the processing of a task, that worker retrieves the next available task stored in the task queue 410 and processes that task. After the set of tasks generated at block 602 have been processed, the forensic analysis system 210 can terminate (e.g., spin down) the workers generated at block 604 to conserve and reduce the processing burdens on the cloud compute resources available to the cloud-based response system 130.

Figure 7:
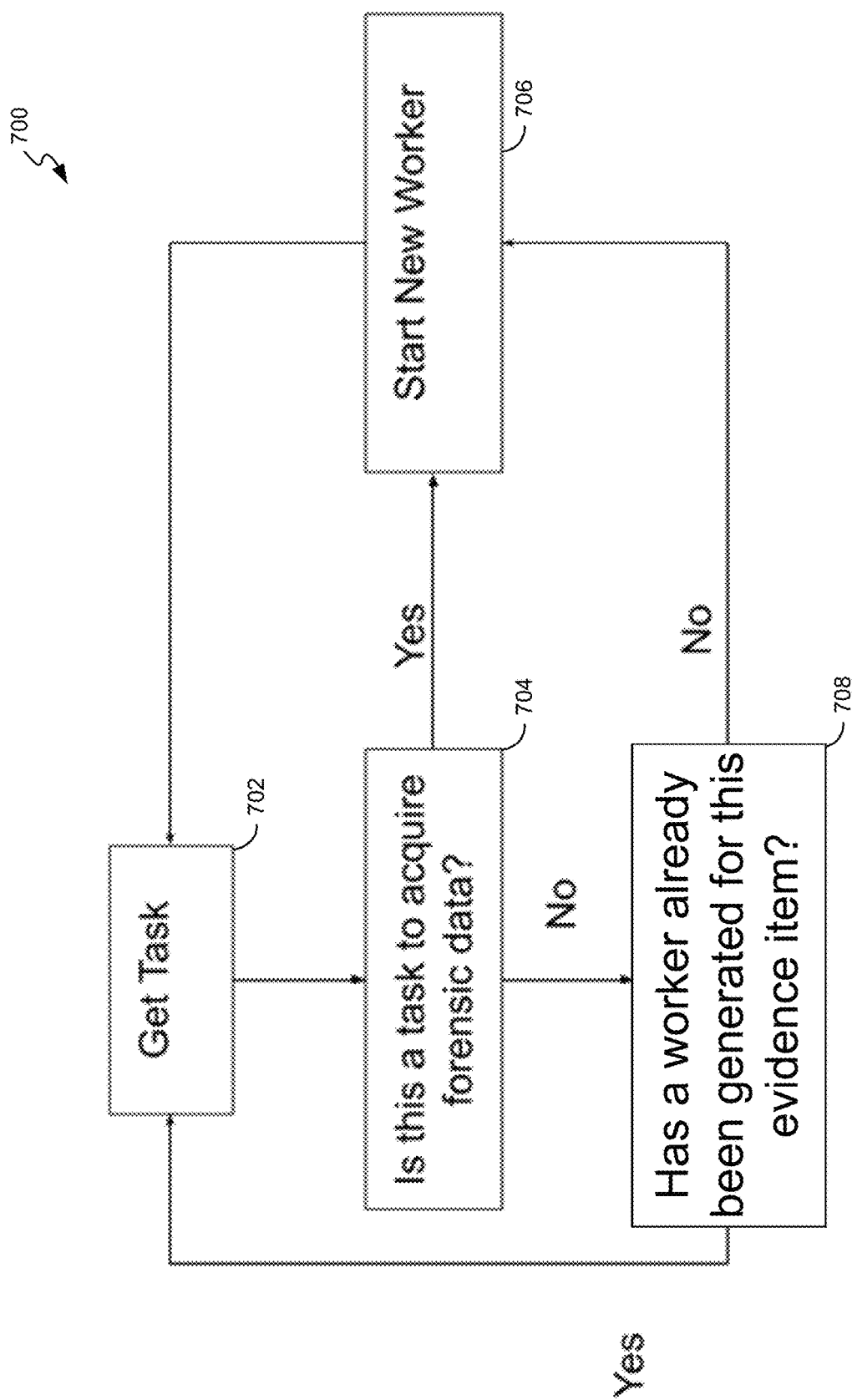
FIG. 7 is a flow chart illustrating an example of a process of a forensic analysis system included in a specialized computer architecture, according to some aspects of the present disclosure.

FIG. 7 is a flow chart illustrating an example of a process 700 of a forensic analysis system included in a specialized computer architecture, according to some aspects of the present disclosure. The process 700 can be performed at least in part by any component described with respect to FIGS. 1-5. For example, the process 700 can be performed by the forensic analysis system 210, illustrated in FIG. 2. Further, the process 700 can be performed by the forensic analysis system 210 to determine whether or not to generate a new worker to process a detected task.

Process 700 begins at block 702, where the forensic analysis system 210 detects or fetches a task from the task queue 410. The forensic analysis system 210 can evaluate the task to determine whether or not to generate a new worker to process the task.

At block 704, the forensic analysis system 210 can determine whether the task that was fetched at block 702 is a task to acquire forensic data. If the forensic analysis system 210 determines that the task is one for acquiring forensic data, then the process 700 proceeds to block 706. At block 706, the forensic analysis system 210 can generate a new worker. For example, the forensic analysis system 210 can allocate a portion of the cloud compute resources (e.g., vCPUs and memory) to each worker that is generated. Additionally, the worker can access the network storage 240 to retrieve executable source code configured to enable the worker to process the task. The new worker can then fetch the task from the task queue 410.

When the result of block 704 is that the task is not to acquire forensic data or is not associated with acquiring forensic data, then the process 700 can proceed to block 708. At block 708, the forensic analysis system 210 can determine whether a worker was previously generated for the particular item of forensic evidence associated with the task of block 702. If the forensic analysis system 210 has not previously generated a worker for the particular item of forensic evidence (e.g., as indicated by an evidence identifier), then the forensic analysis system 210 can return back to block 706, where a new worker is generated. Alternatively, if the forensic analysis system 210 determines that a worker was previously generated for this particular item of forensic evidence, then the forensic analysis system 210 can identify the previously-generated worker and cause that worker to fetch the task associated with the particular item of forensic evidence. The process 700 continues until each task of the set of tasks has been evaluated to determine whether or not to generate a worker to process that task.

Figure 8:
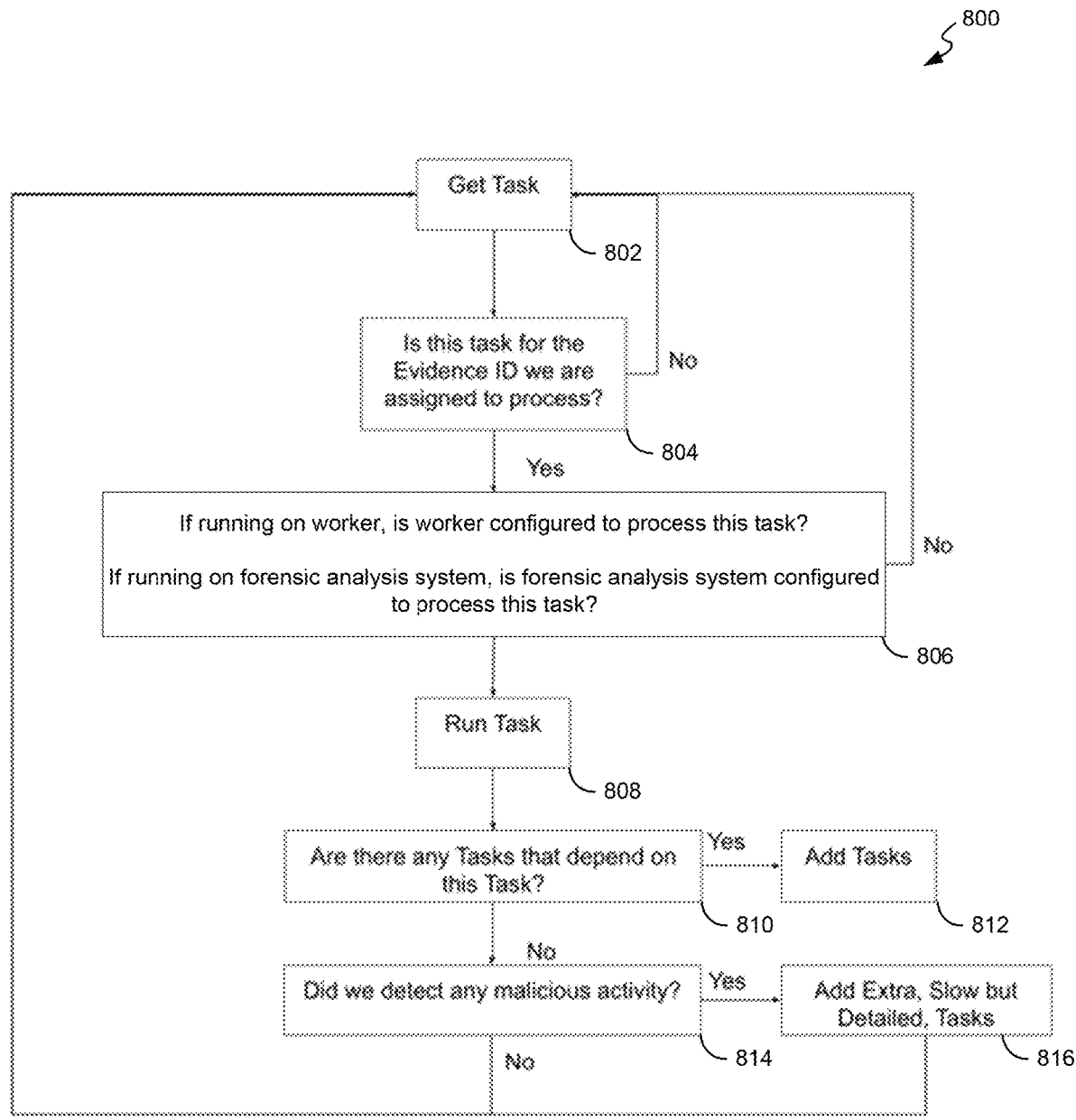
FIG. 8 is a flow chart illustrating another example of a process of a worker that is included in a specialized computer architecture, according to some aspects of the present disclosure.

FIG. 8 is a flow chart illustrating another example of a process 800 of a worker computing device that is included in a specialized computer architecture, according to some aspects of the present disclosure. The process 800 can be performed at least in part by any component described with respect to FIGS. 1-5. For example, the process 800 can be performed by each individual worker of the worker system 530 (illustrated in FIG. 5) or by the forensic analysis system 210 (e.g., a main server in a cloud network). Further, the process 800 can be performed by each worker (or by the forensic analysis system 210 in the cloud network) to determine whether or not the worker or the forensic analysis system 210, respectively, can proceed to process a given task of the set of tasks stored in the task queue 410.

The process 800 begins at block 802, where the worker or the forensic analysis system 210 can detect or fetch a task from the task queue 410. At block 804, the worker or the forensic analysis system 210 can determine whether the task from block 802 is the task that corresponds to the particular item of forensic evidence (e.g., indicated by an evidence identifier) that the worker or the forensic analysis system 210, respectively, is assigned to process. Assigning a worker to a particular item of forensic evidence can be performed at process 700 described above with respect to FIG. 7.

If the output of block 804 is "No," then the process 800 can return back to block 802, where another task is detected or fetched from the task queue 410 (e.g., until the task that is detected is the task for the particular item of evidence assigned to the worker). If the output of block 804 is "Yes," then the process 800 proceeds to block 806.

At block 806, if the worker is performing process 800, then the worker can determine whether the task is of a category of tasks that can be processed using the worker. If the output of block 806 is "No," then the process 800 can return back to block 802. If the output of block 806 is "Yes," then the process 800 can proceed to block 808, where the task is processed by the worker.

If, however, the forensic analysis system 210 is performing process 800, then the forensic analysis system 210 can determine whether the task can be processed using the forensic analysis system 210. In this case, if the output of block 806 is "No," then the process 800 can return back to block 802. If the output of block 806 is "Yes," then the process 800 can proceed to block 808, where the task is processed by the forensic analysis system 210.

Regardless of whether the worker or the forensic analysis system 210 processed the task at block 808, process 800 can proceed to block 810. At block 810, the worker or the forensic analysis system 210 can determine whether there are any other tasks in the task queue 410 that are dependent on the task that was processed at block 808. Dependencies between tasks can be determined using any suitable technique, such as associating task identifiers or querying a lookup table of dependent task. If the output of block 810 is "Yes," then the one or more tasks that are determined to be dependent on the task processed at block 808 can be processed at block 812. If there are no dependent tasks or if all of the dependent tasks have been processed (e.g., an output of "No" from block 810), then the process 800 can proceed to block 814.

At block 814, the worker or the forensic analysis system 210 can determine whether processing the tasks (and any dependent tasks) resulted in the detection of any malicious activity. If processing the task (and any dependent tasks) resulted in the detection of malicious activity (e.g., a "Yes" output of block 814), then the worker or the forensic analysis system 210 can perform additional tasks to mitigate the malicious activity. For example, at block 816, the worker or the forensic analysis system 210 can add a deletion task that deletes malicious data associated with the malicious activity or a cleanup task that otherwise mitigates or contains the detected malicious activity. If processing the task (and any dependent tasks) does not result in the detection of malicious activity (e.g., a "No" output of block 814), then the process 800 can return to block 802. As another example, the additional tasks to mitigate the malicious activity can include creating extra tasks to start matching a malicious file (and files related to the malicious file by the location of the malicious file in the attacked network) against external intelligence sources. The additional tasks to mitigate the malicious activity can be performed internally at components within the cloud-based response system 130 or externally at systems outside of the cloud-based response system 130. As an illustrative example, a SOAR system (Security Orchestration, Automation and Response) can access the cloud-based response system 130 to collect a system for analysis. Then after the cloud-based response system 130 performs and completes a forensic analysis, the cloud-based response system 130 can transmit data back to the SOAR system to trigger additional actions, such as restoring the attacked network to an earlier version or blocking malicious activity detected by the cloud-based response system 130 (e.g., by blocking an IP address in a firewall).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computer-implemented method, comprising:
   collecting a plurality of items of forensic evidence from an attacked network, wherein the attacked network was previously subject to a security incident;
   generating a set of tasks based on the plurality of items of the forensic evidence collected from the attacked network, wherein each task of the set of tasks is associated with an item of the forensic evidence of the plurality of items of the forensic evidence, and wherein the set of tasks is stored in a task queue;
   determining a number of workers to generate based on the set of tasks stored in the task queue, wherein
      each worker of the number of workers is configured to process a respective task of the set of tasks, and
      determining each of the number of workers comprises:
         detecting the respective task among the set of tasks stored in the task queue; and
         analyzing the respective task to determine a condition for execution of the respective task, wherein the condition for the execution of the respective task is related to requirement of acquiring a new item of the forensic evidence from the attacked network;
   generating the number of workers in a cloud network based on the analyzing of the respective task; and
   executing the number of workers in parallel to process the set of tasks stored in the task queue.

2. The computer-implemented method of claim 1, wherein determining the number of workers to generate further comprises:
   detecting a particular task from amongst the set of tasks stored in the task queue;
   determining that the particular task includes acquiring the new item of the forensic evidence from the attacked network; and
   generating a new worker of the number of workers to process the particular task.

3. The computer-implemented method of claim 1, wherein determining the number of workers to generate further comprises:
   detecting a particular task from amongst the set of tasks stored in the task queue, the particular task being associated with a particular item of the forensic evidence of the plurality of items of the forensic evidence;
   determining that the particular task does not include acquiring the new item of the forensic evidence from the attacked network;
   identifying a previously-generated worker associated with the particular item of the forensic evidence; and processing the particular task using the previously-generated worker and the particular item of the forensic evidence.

4. The computer-implemented method of claim 1, wherein executing the number of workers in parallel includes:
   detecting a particular task from the set of tasks stored in the task queue,
   retrieving a particular item of the forensic evidence associated with the particular task, and
   performing the particular task using the particular item of the forensic evidence associated with the particular task.

5. The computer-implemented method of claim 1, wherein executing the number of workers in parallel further comprises:
   assigning a particular item of the forensic evidence of the plurality of items of the forensic evidence to a particular worker of the number of workers;
   determining that a particular task corresponds to the particular item of the forensic evidence;
   determining that a particular worker of the number of workers is configured to process the particular task using the particular item of the forensic evidence, or determining that a main server is configured to process the particular task using the particular item of the forensic evidence; and
   processing the particular task using the particular worker or the main server, depending on whether the particular task was processed by the particular worker or the main server.

6. The computer-implemented method of claim 1, further comprising:
   determining that a particular task of the set of tasks has one or more dependent tasks, wherein each dependent task of the one or more dependent tasks is processed in association with the particular task;
   processing the particular task and the one or more dependent tasks;
   detecting malicious activity within the attacked network; and
   in response to detecting the malicious activity, adding one or more additional tasks to the set of tasks included in the task queue.

7. The computer-implemented method of claim 1, further comprising:
   determining that the set of tasks has been processed by the number of workers; and
   in response to determining that the set of tasks has been processed, terminating each worker of the number of workers, wherein terminating each worker of the number of workers reduces a processing burden imposed on cloud compute resources.

8. A non-transitory computer-readable medium comprising instructions that are executable by a processing device for causing the processing device to perform operations comprising:
   collecting a plurality of items of forensic evidence from an attacked network, wherein the attacked network was previously subject to a security incident;
   generating a set of tasks based on the plurality of items of the forensic evidence collected from the attacked network, wherein each task of the set of tasks is associated with an item of the forensic evidence of the plurality of items of the forensic evidence, and wherein the set of tasks is stored in a task queue;
   determining a number of workers to generate based on the set of tasks stored in the task queue, wherein
      each worker of the number of workers is configured to process a respective task of the set of tasks, and
      determining each of the number of workers comprises:
         detecting the respective task among the set of tasks stored in the task queue; and
         analyzing the respective task to determine a condition for execution of the respective task, wherein the condition for the execution of the respective task is related to requirement of acquiring a new item of the forensic evidence from the attacked network;
   generating the number of workers in a cloud network based on the analyzing of the respective task; and
   executing the number of workers in parallel to process the set of tasks stored in the task queue.

9. The non-transitory computer-readable medium of claim 8, wherein determining the number of workers to generate further comprises:
   detecting a particular task from amongst the set of tasks stored in the task queue;
   determining that the particular task includes acquiring the new item of the plurality of items of the forensic evidence from the attacked network; and
   generating a new worker of the number of workers to process the particular task.

10. The non-transitory computer-readable medium of claim 8, wherein determining the number of workers to generate further comprises:
   detecting a particular task from amongst the set of tasks stored in the task queue, the particular task being associated with a particular item of the forensic evidence of the plurality of items of the forensic evidence;
   determining that the particular task does not include acquiring the new item of the forensic evidence from the attacked network;
   identifying a previously-generated worker associated with the particular item of the forensic evidence; and
   processing the particular task using the previously-generated worker and the particular item of the forensic evidence.

11. The non-transitory computer-readable medium of claim 8, wherein executing the number of workers in parallel includes:
   detecting a particular task from the set of tasks stored in the task queue,
   retrieving a particular item of the forensic evidence associated with the particular task, and
   performing the particular task using the particular item of the forensic evidence associated with the particular task.

12. The non-transitory computer-readable medium of claim 8, wherein executing the number of workers in parallel further comprises:
   assigning a particular item of the forensic evidence of the plurality of items of the forensic evidence to a particular worker of the number of workers;
   determining that a particular task corresponds to the particular item of the forensic evidence;
   determining that a particular worker of the number of workers is configured to process the particular task using the particular item of the forensic evidence, or determining that a main server is configured to process the particular task using the particular item of the forensic evidence; and processing the particular task using the particular worker or the main server, depending on whether the particular task was processed by the particular worker or the main server.

13. The non-transitory computer-readable medium of claim 8, wherein the operations further comprise:
   determining that a particular task of the set of tasks has one or more dependent tasks, wherein each dependent task of the one or more dependent tasks is processed in association with the particular task;
   processing the particular task and the one or more dependent tasks;
   detecting malicious activity within the attacked network; and
   in response to detecting the malicious activity, adding one or more additional tasks to the set of tasks included in the task queue.

14. The non-transitory computer-readable medium of claim 8, wherein the operations further comprise:
   determining that the set of tasks has been processed by the number of workers; and
   in response to determining that the set of tasks has been processed, terminating each worker of the number of workers, wherein terminating each worker of the number of workers reduces a processing burden imposed on cloud compute resources.

15. A system, comprising:
   one or more processors; and
   a non-transitory computer-readable storage medium containing instructions which, when executed on the one or more processors, cause the one or more processors to perform operations including:
      collecting a plurality of items of forensic evidence from an attacked network, wherein the attacked network was previously subject to a security incident;
      generating a set of tasks based on the plurality of items of the forensic evidence collected from the attacked network, wherein each task of the set of tasks is associated with an item of the forensic evidence of the plurality of items of the forensic evidence, and wherein the set of tasks is stored in a task queue;
      determining a number of workers to generate based on the set of tasks stored in the task queue, wherein each worker of the number of workers is configured to process a respective task of the set of tasks, and determining each of the number of workers comprises:
         detecting the respective task among the set of tasks stored in the task queue; and
         analyzing the respective task to determine a condition for execution of the respective task, wherein the condition for the execution of the respective task is related to requirement of acquiring a new item of the forensic evidence from the attacked network;
      generating the number of workers in a cloud network based on the analyzing of the respective task; and
      executing the number of workers in parallel to process the set of tasks stored in the task queue.

16. The system of claim 15, wherein determining the number of workers to generate further comprises:
   detecting a particular task from amongst the set of tasks stored in the task queue;
   determining that the particular task includes acquiring the new item of the plurality of items of the forensic evidence from the attacked network; and
   generating a new worker of the number of workers to process the particular task.

17. The system of claim 15, wherein determining the number of workers to generate further comprises:
   detecting a particular task from amongst the set of tasks stored in the task queue, the particular task being associated with a particular item of the forensic evidence of the plurality of items of the forensic evidence;
   determining that the particular task does not include acquiring the new item of the forensic evidence from the attacked network;
   identifying a previously-generated worker associated with the particular item of the forensic evidence; and
   processing the particular task using the previously-generated worker and the particular item of the forensic evidence.

18. The system of claim 15, wherein executing the number of workers in parallel includes:
   detecting a particular task from the set of tasks stored in the task queue,
   retrieving a particular item of the forensic evidence associated with the particular task, and
   performing the particular task using the particular item of the forensic evidence associated with the particular task.

19. The system of claim 15, wherein executing the number of workers in parallel further comprises:
   assigning a particular item of the forensic evidence of the plurality of items of the forensic evidence to a particular worker of the number of workers;
   determining that a particular task corresponds to the particular item of the forensic evidence;
   determining that a particular worker of the number of workers is configured to process the particular task using the particular item of the forensic evidence, or determining that a main server is configured to process the particular task using the particular item of the forensic evidence; and
   processing the particular task using the particular worker or the main server, depending on whether the particular task was processed by the particular worker or the main server.

20. The system of claim 15, wherein the operations further comprise:
   determining that a particular task of the set of tasks has one or more dependent tasks, wherein each dependent task of the one or more dependent tasks is processed in association with the particular task;
   processing the particular task and the one or more dependent tasks;
   detecting malicious activity within the attacked network; and
   in response to detecting the malicious activity, adding one or more additional tasks to the set of tasks included in the task queue.

* * * * *